UNITED STATES PATENT OFFICE.

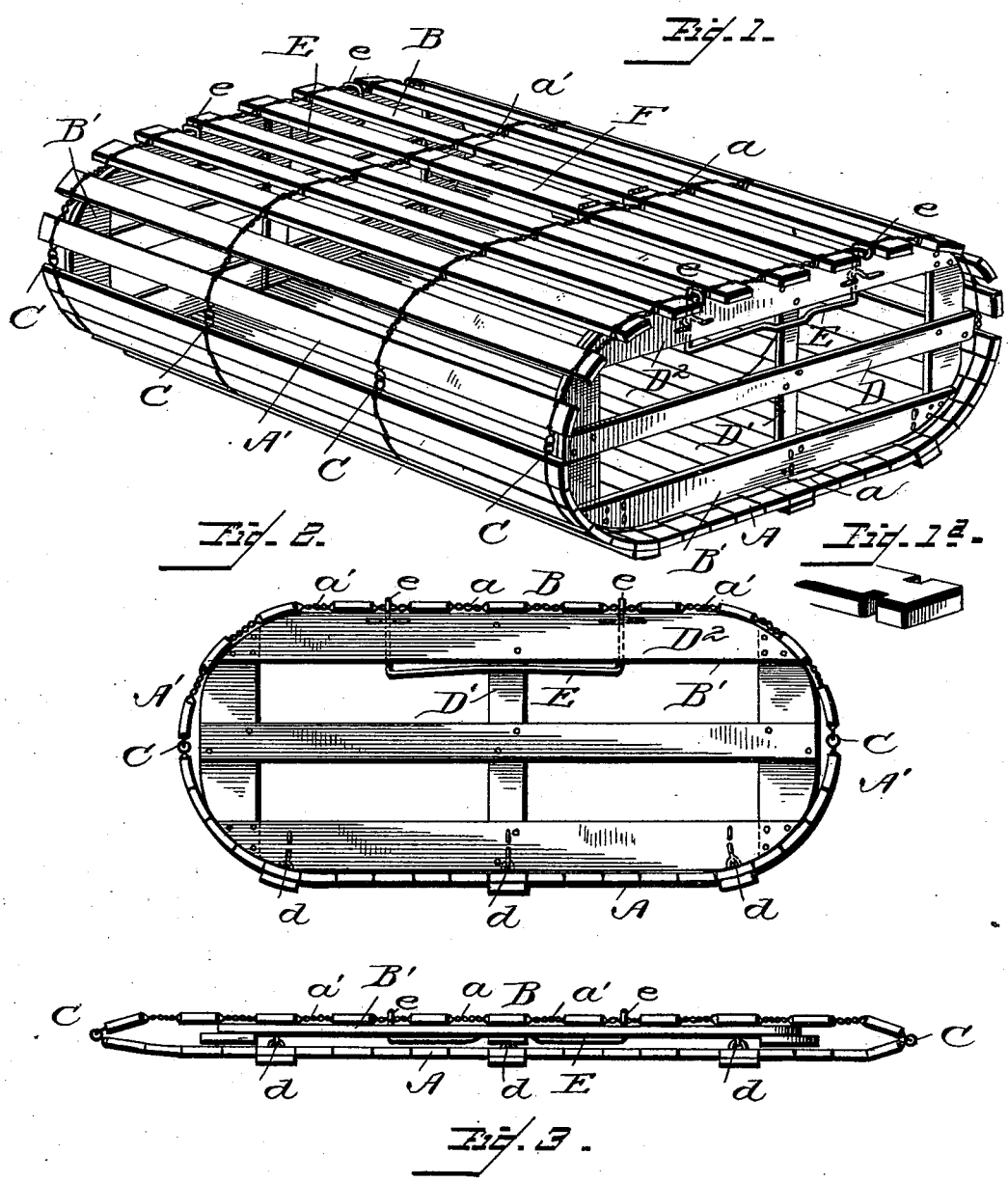

THOMAS MARR AND JULIUS GRAHAM, OF BUENA VISTA, VIRGINIA.

COOP.

SPECIFICATION forming part of Letters Patent No. 514,949, dated February 20, 1894.

Application filed April 3, 1893. Serial No. 468,877. (No model.)

*To all whom it may concern:*

Be it known that we, THOMAS MARR and JULIUS GRAHAM, citizens of the United States, residing at Buena Vista, in the county of Rockbridge and State of Virginia, have invented certain new and useful Improvements in Coops, of which the following is a specification.

The object of our invention is to provide a knock-down coop of an improved construction, especially adapted for poultry. We design to make the coop in the most inexpensive manner, and yet strong and durable and easily set up and knocked down, to provide either sufficient space for holding the poultry or to be flattened out to occupy the least possible space in transportation.

In the accompanying drawings,—Figure 1 is a perspective view of our improved poultry coop, set up and ready for use. Fig. 1$^a$ is a detail of the end of slat. Fig. 2 is an end view thereof. Fig. 3 is an end view of the coop knocked down and flattened out ready for transportation.

The bottom, top and sides of the coop are made of slats held together by wires woven and twisted between them. The bottom A has the slats closely arranged together, the wires $a$, being made to embrace the slats, and are twisted or crossed between them. Preferably, the wires are arranged in grooves in the edges of the slats, as indicated in Fig. 1$^a$. The sides A' and top B, have the slats arranged a suitable distance apart to admit of free ventilation. Between the slats, the wires have a number of twists or turns, as shown at $a'$. The sides are curved, so that in cross section, the coop has an oval form. By this arrangement, sharp corners are avoided, and the greatest strength is given to the coop, and at the same time there is no appreciable loss of space.

We employ hinges C, on opposite sides of the coop. These may be made by looping together the wires on a central horizontal plane opposite each other, in order that the upper portion may be flattened out and laid upon the lower portion, as indicated in Fig. 3, the hinges C, facilitating this operation. There is sufficient flexibility of the wires between the slats to enable the coop sections to flatten out, as indicated.

The end pieces B', may be made in any suitable way. They are preferably formed of slats, and are oval shaped to fit the ends of the coop when the upper and lower portions thereof are distended. The ends are hinged at $d$, in any suitable way to the bottom of the coop. At the top, they carry catches E, which, as shown, are made of wire having hooked ends $e$. The horizontal portion of the catch E, extends across the outside of the vertical slat D', of the end piece, and the vertical portions of the catch pass behind the horizontal upper slat D$^2$, of the end piece. By this arrangement, a certain resiliency is given to the ends of the catches, so that the hooks $e$, may be engaged and disengaged from the wires at the edge of the coop, which hold the slats together. The hooks $e$, are shown engaged with the wires in Figs. 1 and 2.

The door F, may be made in any suitable way. It may be a hinged door, as shown, or it may be a sliding door.

Although we prefer to make the coop oval in cross section, it may be, so far as some features of our invention are concerned, made rectangular or other shape. The arrangement is such that when the end pieces are turned on their hinges and laid flat upon the bottom of the coop, the upper section of the coop may be flattened out and the catches $e$ may be made to engage with the central wires which bind together the slats. The hooks $e$ are shown as engaging these wires, in Fig. 3. By this arrangement when the coop is knocked down, it will be held together, flattened out to occupy the least possible space, and it will not shake apart, rattle or flop about, as it might otherwise do.

We claim as our invention—

The knock-down coop herein described comprising the slatted upper and lower sections, each formed of slats held together by twisted wires the upper section being hinged to the lower section at opposite sides of the coop, between the top and bottom thereof, in combination with end pieces hinged to the lower section of the coop and provided with catches adapted to engage with cross wires at the edges of the top of the coop, and with cross wires carried by the top of the coop between the ends thereof.

In testimony whereof we have hereunto subscribed our names.

THOS. MARR.
JULIUS GRAHAM.

Witnesses:
A. TIMBERLAKE,
DAVID R. MILLER.